(12) United States Patent
Lambert et al.

(10) Patent No.: US 9,889,517 B2
(45) Date of Patent: Feb. 13, 2018

(54) METHOD FOR SELECTION OF WELD CONTROL ALGORITHMS

(75) Inventors: Roger H. Lambert, West Lebanon, NH (US); Geoffrey H. Putnam, Topsham, VT (US)

(73) Assignee: Victor Equipment Company, Chesterfield, MO (US)

( * ) Notice: Subject to any disclaimer, the term of this patent is extended or adjusted under 35 U.S.C. 154(b) by 554 days.

(21) Appl. No.: 13/481,066

(22) Filed: May 25, 2012

(65) Prior Publication Data

US 2012/0298643 A1 Nov. 29, 2012

Related U.S. Application Data

(60) Provisional application No. 61/490,329, filed on May 26, 2011.

(51) Int. Cl.
*B23K 9/10* (2006.01)
*B23K 9/00* (2006.01)
*B23K 9/095* (2006.01)

(52) U.S. Cl.
CPC .......... *B23K 9/0953* (2013.01); *B23K 9/0956* (2013.01); *B23K 9/10* (2013.01)

(58) Field of Classification Search
CPC ... B23K 9/10; B23K 9/00; B23K 1/00; H05B 7/11
USPC ... 219/130.5, 132, 136, 137, 137.7, 129, 75, 219/108, 110, 130.1, 130.21, 130.31, 219/130.33, 137 PS, 137 R; 700/212
See application file for complete search history.

(56) References Cited

U.S. PATENT DOCUMENTS

| | | |
|---|---|---|
| 3,509,314 A | 4/1970 | Freytag |
| 3,906,184 A | 9/1975 | Gibbs et al. |
| 3,950,759 A | 4/1976 | Ziegenfuss |
| 4,000,374 A | 12/1976 | De Keyser |
| 4,153,409 A | 5/1979 | Capps et al. |
| 4,300,035 A | 11/1981 | Johansson |
| 4,300,036 A | 11/1981 | Johansson |
| 4,319,124 A | 3/1982 | Johansson |
| 4,403,135 A | 9/1983 | Moyer et al. |
| 4,447,700 A | 5/1984 | Cohen |

(Continued)

FOREIGN PATENT DOCUMENTS

| | | |
|---|---|---|
| CN | 1851998 A | 10/2006 |
| CN | 1866719 A | 11/2006 |

(Continued)

OTHER PUBLICATIONS

PCT Serial No. PCT/US2012/039520—Notification of Transmittal of the International Search Report and the Written Opinion of the International Searching Authority, dated Mar. 3, 2013.

(Continued)

*Primary Examiner* — Michael Laflame, Jr.
(74) *Attorney, Agent, or Firm* — Edell, Shapiro & Finnan, LLC (57) ABSTRACT

A system and method for generating a weld are provided. The system receives a selection of a magnitude of a voltage. The system selects a first weld control algorithm when the magnitude of the voltage is in a first range of values. The system may also select a second weld control algorithm when the magnitude of the voltage is in a second range of values. The system may generate welding output power based on the first and second weld control algorithms.

27 Claims, 5 Drawing Sheets

(56) References Cited

U.S. PATENT DOCUMENTS

| | | | |
|---|---|---|---|
| 4,450,340 A | 5/1984 | Corrigall et al. | |
| 4,734,556 A | 3/1988 | Namiki | |
| 4,746,051 A | 5/1988 | Peter | |
| 5,045,670 A | 9/1991 | Gilliland | |
| 5,136,139 A | 8/1992 | Gilliland | |
| 5,221,825 A | 6/1993 | Siewert et al. | |
| 5,223,683 A | 6/1993 | Ishizaka | |
| 5,233,158 A | 8/1993 | Karakama et al. | |
| 5,270,516 A | 12/1993 | Hamamoto et al. | |
| 5,938,945 A | 8/1999 | Hofmann et al. | |
| 6,087,627 A * | 7/2000 | Kramer | 219/130.21 |
| 6,207,928 B1 | 3/2001 | Kawamoto et al. | |
| 6,236,017 B1 * | 5/2001 | Smartt et al. | 219/130.01 |
| 6,335,511 B1 | 1/2002 | Rothermel | |
| 6,344,627 B1 | 2/2002 | Yonemori et al. | |
| 6,441,342 B1 | 8/2002 | Hsu | |
| 6,642,483 B1 | 11/2003 | Koga et al. | |
| 6,791,063 B2 | 9/2004 | Manthe | |
| 6,815,640 B1 | 11/2004 | Spear et al. | |
| 7,005,610 B2 | 2/2006 | Ihde et al. | |
| 7,041,937 B2 | 5/2006 | Ihde et al. | |
| 9,314,866 B2 | 4/2016 | Lambert et al. | |
| 2002/0117489 A1 | 8/2002 | Arndt et al. | |
| 2003/0222054 A1 * | 12/2003 | Katou | B23K 11/11 219/86.9 |
| 2004/0069752 A1 * | 4/2004 | Ulrich et al. | 219/121.39 |
| 2004/0079740 A1 | 4/2004 | Myers et al. | |
| 2004/0099649 A1 * | 5/2004 | DeCoster | 219/130.21 |
| 2004/0173591 A1 | 9/2004 | Knoener | |
| 2004/0188405 A1 | 9/2004 | Holverson et al. | |
| 2005/0016974 A1 | 1/2005 | Myers et al. | |
| 2005/0045611 A1 * | 3/2005 | Ihde et al. | 219/137.71 |
| 2005/0199605 A1 | 9/2005 | Furman et al. | |
| 2005/0258156 A1 | 11/2005 | Rice et al. | |
| 2006/0000812 A1 * | 1/2006 | Weber et al. | 219/121.61 |
| 2006/0016792 A1 | 1/2006 | Uecker et al. | |
| 2006/0076332 A1 | 4/2006 | Matus et al. | |
| 2006/0108343 A1 * | 5/2006 | Schwartz | B23K 9/10 219/130.33 |
| 2006/0131291 A1 | 6/2006 | Kaufman et al. | |
| 2006/0163229 A1 | 7/2006 | Hutchison et al. | |
| 2006/0196862 A1 * | 9/2006 | Sickels | 219/130.5 |
| 2006/0196865 A1 | 9/2006 | Sickels | |
| 2006/0213892 A1 * | 9/2006 | Ott | 219/132 |
| 2007/0164007 A1 | 7/2007 | Peters et al. | |
| 2007/0181547 A1 | 8/2007 | Vogel et al. | |
| 2007/0181553 A1 * | 8/2007 | Stanzel et al. | 219/137.71 |
| 2007/0251932 A1 | 11/2007 | Vogel et al. | |
| 2007/0262065 A1 | 11/2007 | Peters et al. | |
| 2008/0006612 A1 | 1/2008 | Peters et al. | |
| 2008/0011728 A1 * | 1/2008 | Peters et al. | 219/130.5 |
| 2008/0017621 A1 | 1/2008 | Uecker | |
| 2008/0078811 A1 * | 4/2008 | Hillen et al. | 228/101 |
| 2008/0078812 A1 | 4/2008 | Peters et al. | |
| 2008/0149610 A1 | 6/2008 | Huismann et al. | |
| 2008/0156782 A1 | 7/2008 | Rice et al. | |
| 2008/0203065 A1 * | 8/2008 | Feldhausen | B23K 9/013 219/68 |
| 2008/0264915 A1 * | 10/2008 | Manthe et al. | 219/130.31 |
| 2009/0008374 A1 * | 1/2009 | Fosbinder | 219/130.21 |
| 2009/0032513 A1 | 2/2009 | Nishisaka et al. | |
| 2009/0112343 A1 * | 4/2009 | Yuan et al. | 700/101 |
| 2009/0139971 A1 | 6/2009 | Huismann et al. | |
| 2009/0152251 A1 * | 6/2009 | Dantinne | B23K 9/1062 219/125.1 |
| 2009/0184098 A1 | 7/2009 | Daniel et al. | |
| 2009/0277893 A1 * | 11/2009 | Speilman | 219/137.71 |
| 2010/0018954 A1 * | 1/2010 | Hussary et al. | 219/121.44 |
| 2010/0065540 A1 | 3/2010 | Ihara et al. | |
| 2010/0108654 A1 | 5/2010 | Ulrich et al. | |
| 2010/0126976 A1 | 5/2010 | Kawamoto et al. | |
| 2010/0200553 A1 | 8/2010 | Yamazaki et al. | |
| 2010/0230394 A1 | 9/2010 | Yokota et al. | |
| 2010/0237052 A1 | 9/2010 | Daniel et al. | |
| 2010/0276406 A1 * | 11/2010 | Silk et al. | 219/133 |
| 2010/0288734 A1 | 11/2010 | Dave et al. | |
| 2010/0301029 A1 | 12/2010 | Meckler et al. | |
| 2010/0308026 A1 | 12/2010 | Vogel | |
| 2010/0308027 A1 | 12/2010 | Vogel | |
| 2010/0314371 A1 | 12/2010 | Davidson et al. | |
| 2011/0017718 A1 | 1/2011 | Kazmaier et al. | |
| 2011/0108536 A1 | 5/2011 | Inada et al. | |
| 2011/0155710 A1 | 6/2011 | Farah et al. | |
| 2011/0204034 A1 | 8/2011 | Schartner et al. | |
| 2011/0309053 A1 | 12/2011 | Baus | |
| 2012/0298641 A1 | 11/2012 | Lambert et al. | |
| 2012/0298642 A1 | 11/2012 | Lambert et al. | |
| 2012/0298644 A1 | 11/2012 | Lambert et al. | |

FOREIGN PATENT DOCUMENTS

| | | |
|---|---|---|
| CN | 101125389 A | 2/2008 |
| CN | 101217255 A | 7/2008 |
| CN | 101686016 A | 3/2010 |
| DE | 3523879 | 1/1987 |
| EP | 2163337 | 3/2010 |
| JP | S6171178 | 4/1986 |
| JP | S63299862 A | 12/1988 |
| JP | 2001298994 | 10/2001 |
| JP | 2003071564 | 3/2003 |
| JP | 2006116561 | 5/2006 |
| JP | 2008/307569 A | 12/2008 |
| WO | 2011106175 | 9/2011 |

OTHER PUBLICATIONS

Search Report for PCT/US2012/039563 dated Sep. 28, 2012.
Ex Parte Gary M. Katz, Appeal 2010-006083, U.S. Appl. No. 09/828,122, dated Mar. 29, 2011.
Search Report for PCT/US2012/039516 dated Sep. 28, 2012.
Search Report for PCT/US2012/039552 dated Sep. 28, 2012.

* cited by examiner

United States Patent US 9,889,517 B2

METHOD FOR SELECTION OF WELD CONTROL ALGORITHMS

CROSS REFERENCE TO RELATED APPLICATIONS

This application claims the benefit of U.S. Provisional Patent Application No. 61/490,329 filed May 26, 2011, the content of which is hereby incorporated by reference in its entirety.

BACKGROUND

The present application is related to a welding system configured to switch between weld control algorithms.

SUMMARY

Welding control systems may not provide for optimal automatic control of short-circuit, globular, and spray transfer, and spatter, base material penetration, bead shape and heat input. Welding control system may also fail to provide optimal automatic control in other welding processes, including flux core arc welding, shielded metal arc welding, and gas tungsten arc welding. A system is contemplated herein which may improve these conditions by switching weld control algorithms.

In some implementations, a system for generating a weld is provided. A power circuit generates welding output power for a welding process. A control circuit is in communication with the power circuit. The control circuit receives a selected value of a magnitude of an output voltage. The control circuit selects a first weld control algorithm from the plurality of weld control algorithms when the magnitude of the voltage is in a first range of values, and selects a second weld control algorithm from the plurality of weld control algorithms when the magnitude of the voltage is in a second range of values.

In some implementations, a method for generating a weld is provided. The method includes receiving a selection of a magnitude of a voltage. The method further includes selecting a first weld control algorithm when the magnitude of the voltage is in a first range of values. The method further includes selecting a second weld control algorithm when the magnitude of the voltage is in a second range of values. The method further includes generating welding output power based on the first and second weld control algorithms.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

FIG. 2b is a front view of an interface on the housing of FIG. 2a;

It should be understood that throughout the drawings, corresponding reference numerals indicate like or corresponding parts and features.

DETAILED DESCRIPTION

The term "substantially" used herein with reference to a quantity or mathematical relationship includes (1) a variation in the recited quantity or relationship of an amount that is insubstantially different from a recited quantity or relationship for an intended purpose or function, or (2) a variation in the recited quantity or relationship of an amount that produces the same quality.

Figure 1:
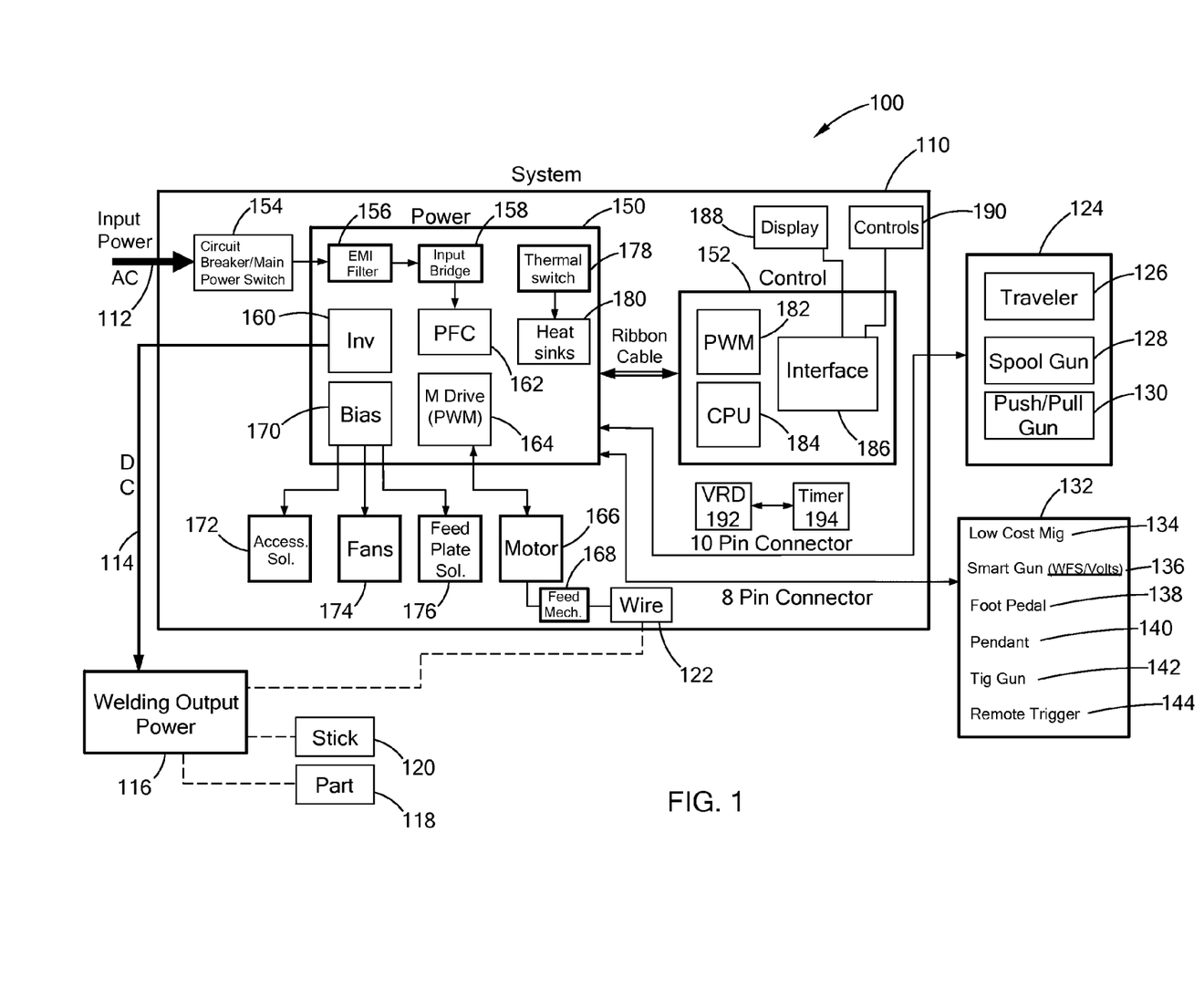
FIG. 1 is a schematic view of a welding system.

Now referring to FIG. 1, a power supply for a welding system 100 is provided. The power supply 110 receives input power 112 which may be an alternating current power line, for example a 220 volt AC power line. However, it is understood that the power supply 110 may be adaptable to receive a range of voltages, for example between 187 to 276 volts AC. In addition, it may also be possible to configure the power supply for other voltage ranges depending on the application and required welding output power. The power supply 110 provides a direct current power output voltage 114 that may be used as a welding output power 116. In some implementations, the power supply 110 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding processes. Therefore, in one example the current return lead of the welding output power 116 may be provided to a part 118 that is to be welded, and the supply voltage may be provided to an electrode, for example a stick 120 or wire 122. Therefore, as the stick 120 comes in contact with the part 118 an arc may be formed that melts both the base metal and electrode and cooperates to form a weld. In other implementations, the output voltage may be provided through a wire 122 which may be continuously fed to the part to form a continuous weld. In TIG mode the electrode is not melted, and generally only the base metal is melted.

The power supply 110 may control the output voltage and the output current, as well as the feeding of the wire to optimize the welding process. In addition, the power supply 110 may be connected to one group of accessories 124 including for example a remote wire feeder 126, a spool gun 128, or a push/pull gun 130. Further, the power supply 110 may be connected to other groups of accessories 132, for example through an 8-pin connector. The second group of accessories 132 may include a MIG gun 134, a smart gun 136, a foot pedal 138, a pendant 140, a TIG gun 142, and/or a remote control/trigger 144.

Within the power supply 110, the input power 112 may be provided to a circuit breaker or switch 154. Power may be provided from the circuit breaker 154 to a power circuit 150. The power circuit 150 may condition the input power to provide a welding output power 116, as well as, for powering various additional accessories to support the welding process. The power circuit 150 may also be in communication with the control circuit 152. The control circuit 152 may allow the user to control various welding parameters, as well as, providing various control signals to the power circuit 150 to control various aspects of the welding process. The power from the circuit breaker 154 may be provided to an EMI filter 156 of the power circuit 150. Power is provided from the EMI filter 156 to an input bridge 158. Power may be provided from the input bridge 158 to a conditioning circuit 162. The conditioning circuit 162 may include a boost circuit, a transformer, as well as a power factor correction circuit. Power is provided from the conditioning circuit 162 to the inverter 160 where the power is converted to a DC signal 114 thereby providing welding output power 116. Power may also be provided to a bias circuit 170 to power a number of accessories internal or external to the power supply 110 that facilitate operation of the power supply and welding process. For example, the bias circuit 170 may provide power to gas solenoid valves 172, fans 174, as well as, other accessory devices. In addition, power is provided to a motor drive circuit 164 that is in communication with a motor 166. The motor 166 may be in communication with a feed mechanism 168 configured to feed wire 122 to a weld gun for use in creation of the weld. The control circuit 152 may provide control signals to any of the previously mentioned circuits in the power circuit 150 to optimize the weld process and performance of the power supply 110. The control circuit 152 may include a pulse width modulator 182 and a processor 184 for analyzing various weld characteristics and calculating various weld parameters according to user settings, as well as, various feedback signals. In addition, an interface circuit 186 may be provided to control a display 188 that may provide information to the user of the welding system. The display 188 may include an LED display, a LCD display, or various other known display technology. The display may provide various menu choices to the user, as well as, providing various feedback on the welding process including the values of various parameters or graphs of previous welding characteristics. The controls 190 may also be in communication with the interface circuit 186 to allow the user to provide input such as various welding parameters to control the operation of the welding process.

The power supply 110 may further include a voltage reducing device (VRD) circuit 192, a low-power circuit that detects contact between the part 118 to be welded and the electrode. When an open circuit condition is detected between the electrode and the work piece, the VRD circuit 192 may reduce the maximum open circuit voltage to safe levels. When contact is made and/or the load is below a threshold resistance, the VRD circuit 192 may no longer reduce the voltage and thus may allow the welding system 100 to operate at full power. The VRD circuit 192 may be in communication with a timer 194. The timer 194 may be implemented as software as part of the control circuit 152, or may be comprised of an electronic circuit.

Figure 2A:
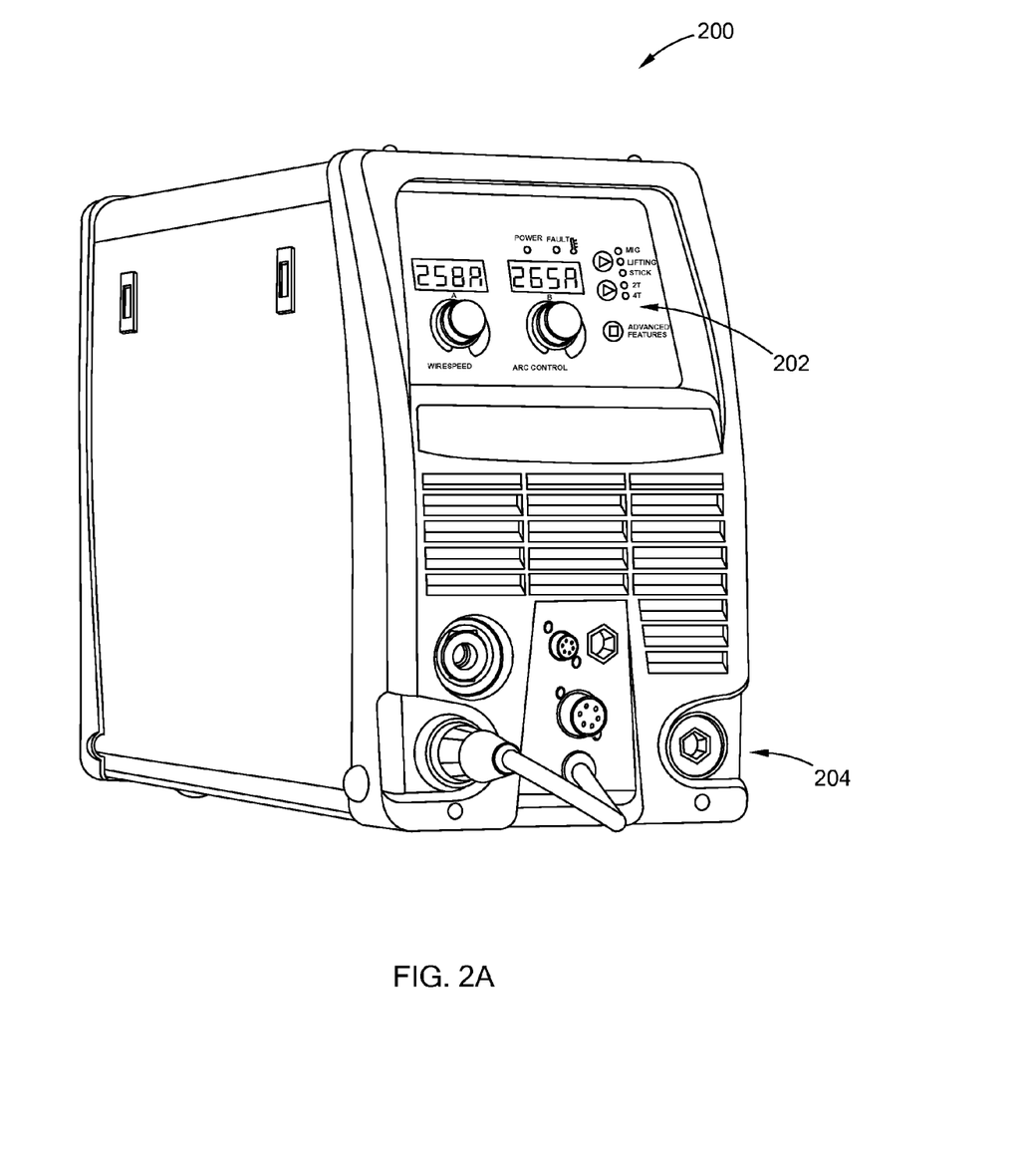
FIG. 2a is a perspective view of a housing which contains the welding system of FIG. 1.

Now referring to FIG. 2*a*, a housing 200 is provided that may be implemented with the welding system 100. The housing 200 may contain the power supply 110, and may further include a user interface 202 and a front connection panel 204. The front connection panel 204 may, for example, be used for connecting the power supply 110 to the first and second groups of accessories 124 and 132, as discussed above.

Figure 2B:
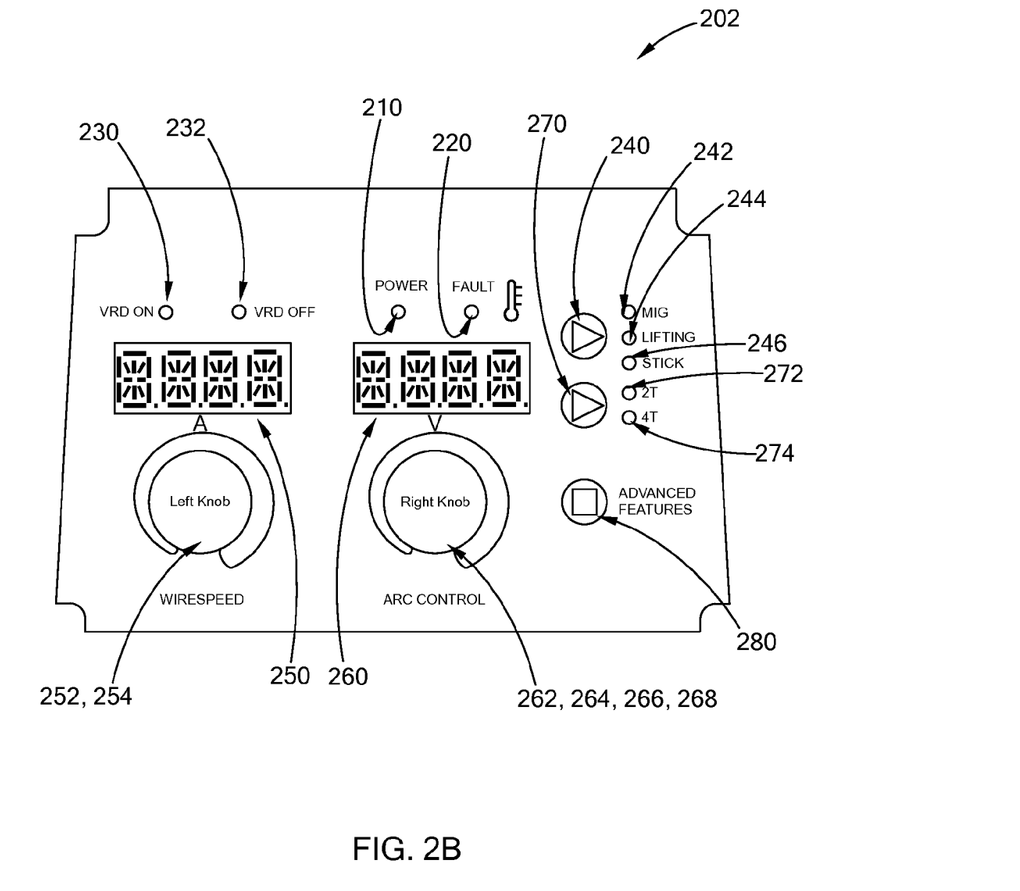

Now referring to FIG. 2*b*, a particular implementation of a user interface 202 is provided that may include various inputs selectable by a user and various indicators and displays. A power indicator 210 may indicate when the power supply 110 is receiving the input power 112. A fault light 220 may indicate when the welding process has entered a fault condition. A VRD "on" indicator 230 may indicate when the VRD is on, and a VRD "off" indicator 232 may indicate when the VRD is off.

A mode selection input 240 may allow the user to select a desired welding process. The mode selection input 240 may be a button which when pressed causes the power supply 100 to cycle through and select a welding process. Three welding process indicators 242, 244, 246 may respectively light upon selection of, for example, MIG, TIG, or stick welding. The MIG selection provides a suitable configuration for both gas metal arc welding and flux core arc welding.

A trigger interlock input 270 may allow a user to select between 2T and 4T modes for MIG, TIG and stick welds that are activated via an electric switch. The 2T mode allows the user to push and hold the switch to activate and release the switch to deactivate. The 4T mode allows the user to push and release the switch to activate, then push and release the switch again to deactivate. An indicator 272 may light when the 2T mode is selected, and an indicator 274 may light when the 4T mode is selected.

An amperage input 252 may allow a user to select a desired output current. A wire feed speed input 254 may allow a user to select a desired wire feed speed of the wire 122. The desired wire feed speed may be a desired steady-state wire feed speed. In some implementations, the inputs 252 and 254 may be combined into an adjustable knob. A user may press the adjustment knob to cycle between the inputs 252 and 254, and then turn the adjustment knob to select a desired value of the current or wire feed speed. The selected desired value may be displayed on a display 250, which may be a super bright red LED display.

A voltage input 262 may allow a user to select a desired output voltage of the welding signal. An inductance input 264 may allow a user to select a desired inductance which, for example, may optimize weld bead characteristics. An arc force input 266 may allow a user to select desired properties of arc force. A down slope input 268 may allow a user to select a down slope time, which is a function of the down ramp rate of the output current. In some implementations, the inputs 262, 264, 266, and 268 may be combined into an adjustable knob. A user may press the adjustment knob to cycle between the inputs 262, 264, 266, and 268, and then turn the adjustment knob to select a desired value of the voltage, inductance, or down slope. The selected desired value may be displayed on a display 260, which may be a super bright red LED display.

An advanced features input 280 may allow a user to select menus and toggle through various further inputs, which are displayed on the displays 250 and 260. A MIG welding main menu may provide inputs for operation control, pre-flow, spot on/off, spot time, stitch on/off, stitch time, dwell time, run-in percentage, post-flow, burn back time, wire sharp, and/or a setup submenu. The setup submenu may provide inputs for wire feed units, amperage calibration, voltage calibration, wire speed calibration, arc hour display, VRD (on, off or triggered), total weld energy (for heat input computation), and/or factory defaults. A stick welding main menu may provide inputs for operation control, hot start on/off, hot start time, hot start amperage, and/or a setup submenu. The setup submenu may provide inputs for arc hour display, VRD disable, and factory defaults. The TIG main menu may provide inputs for operation control, pre-flow, post-flow, and a setup submenu. The setup submenu may provide inputs for arc hour display, VRD disable, and factory defaults.

Burn back time may refer to an adjustable period of time that the power supply 110 may provide power for the welding process after the wire feed stops in order to burn back the wire and prevent it from sticking in the weld puddle. Wire sharp refers to the application of predetermined current outputs applied to the wire, for example, a rapid series of powerful current pulses after the motor 166 is de-energized. This prevents a ball of molten metal from freezing on the end of the welding wire, and tapers the end of the weld wire to a sharp point, promoting a cleaner start when welding resumes. The current outputs terminate when an open-circuit is detected or after a predetermined time or condition is reached. Run-in percentage refers to a percent of wire feed speed. The percentage may range, for example, from about 25 percent to about 150 percent of the wire feed speed. The run-in setting may, for example, allow a user to temporarily alter the selected wire feed speed to optimize MIG weld start characteristics.

The control circuit 152 may receive each of the quantities respectively associated with each of the inputs. Further, although the above inputs are shown in particular implementations, each of the inputs may be configured as a dial, adjustment knob, button, or switch, for example. Additionally, in some implementations, some of the inputs may be automatically selected by the control circuit 152. Which inputs are automatically selected and which inputs are user-selectable may depend on which welding process is selected. In some implementations, some parameters, for example wire diameter, material, gas, and joint design, may not be programmed into the control circuit 152.

Figure 3:
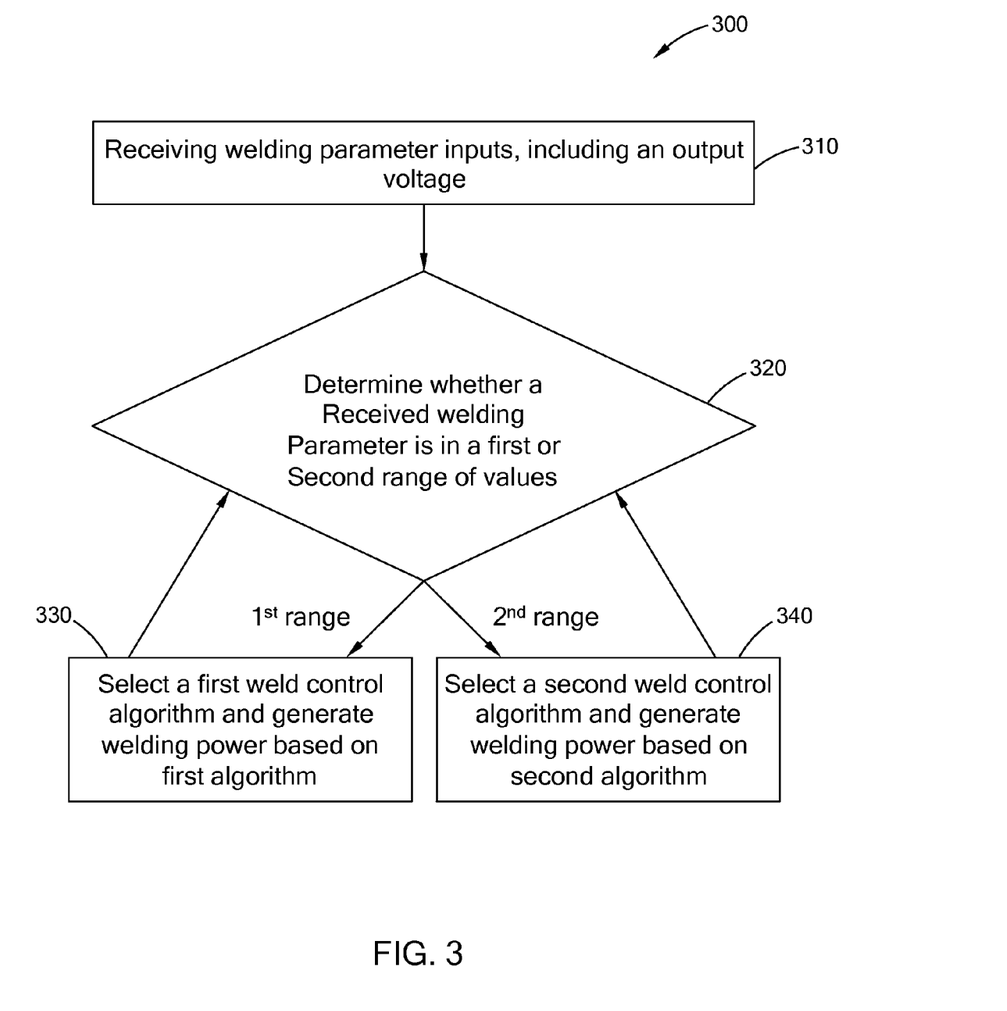
FIG. 3 is a flow chart illustrating a method for automatically selecting weld control algorithms.

Now referring to FIG. 3, a method 300 for automatically selecting weld control algorithms is provided. The method 300 may be implemented in gas metal arc welding and flux core arc welding, for example when the MIG welding setting is selected. The method may also be implemented in shielded metal arc welding or tungsten inert gas welding, for example. The ordering of the steps presented herein is merely one implementation of the method 300. Those skilled in the art will recognize that the ordering may be varied, that some steps may occur simultaneously, that some steps may be omitted, and that further steps may be added. Moreover, each step involving the controller may be implemented by configuring (e.g. programming) the controller to perform the step.

The method 300 starts in block 310. In block 310, if the selected welding process is gas metal arc welding or flux core arc welding, then the control circuit 152 may receive a magnitude of the output voltage from the voltage input 262. In some implementations, the control circuit may also receive the wire feed speed, inductance, burn-back time, polarity (or variables that define a variable polarity, for example magnitude of polarity and frequency of change in polarity), and/or wire sharp settings from their respective inputs. If the selected welding process is shielded metal arc welding, the control circuit may receive output current, arc force, polarity (or variables that define a variable polarity, for example magnitude of polarity and frequency of change in polarity), hot start amplitude and/or hot start duration settings from their respective inputs. If the selected welding process is gas tungsten arc welding, the control circuit may receive output current, slope control (e.g. starting current, down slope time, and/or up slope time), crater fill, and/or polarity (or variables that define a variable polarity, for example magnitude of polarity and frequency of change in polarity) settings from their respective inputs. Any of the foregoing welding parameters can be user-selected, automatically-selected, or programmed.

In some implementations, regardless of the type of welding process, the control circuit 152 may instead receive feedback measurements of the actual magnitude of output voltage rather than a selected output voltage. The control circuit 152 may also receive feedback measurements of the actual magnitude of output current. The method 300 may proceed from block 310 to block 320.

In decision block 320, the control circuit 152 may continuously determine whether a selected welding parameter, for example the magnitude of the output voltage, is in a first range of values or a second range of values. If the magnitude of the output voltage is in a first range of values, then the method proceeds to block 330. If the magnitude of the output voltage is in a second range of values, then the method proceeds to block 340. In some implementations, if the selected welding process is, for example, gas metal arc welding or flux core arc welding, the determination of which block to proceed to may depend on whether the output voltage, inductance, wire feed speed, burn-back time, polarity (or variables that define a variable polarity, for example magnitude of polarity and frequency of change in polarity), wire sharp setting, or combinations thereof fall into respective first and second ranges of values. In other implementations, if the selected welding process is, for example, shielded metal arc welding, the determination of which block to proceed to may depend on whether the output current, arc force, polarity (or variables that define a variable polarity, for example magnitude of polarity and frequency of change in polarity), hot start amplitude and/or hot start duration, or combinations thereof fall into respective first and second ranges of values. If the selected welding process is, for example, gas tungsten arc welding, the determination of which block to proceed to may depend on whether the output current, slope control (e.g. starting current, down slope time, and/or up slope time), crater fill, and/or polarity (or variables that define a variable polarity, for example magnitude of polarity and frequency of change in polarity), or combinations therefore fall into respective first and second ranges of values.

In the implementations where the control circuit 152 receives feedback measurements of the actual magnitude of output voltage and/or output current instead of selected welding parameters, the determination of which block to go to may depend on whether the actual output voltage, actual output current, or combinations therefore, fall within the first or second ranges of voltages. The method 300 may proceed from block 320 to block 330.

In block 330, the control circuit 152 may select the first weld control algorithm. If the selected welding process is gas metal arc welding or flux core arc welding, the first weld control algorithm may be a proportional-integral-derivative (PID) feedback loop, for example, or one of several variations such as a proportional-integral (PI) control loop. The PI loop may be a fast inner loop that cycles about once every fifty microseconds, and may provide short-circuit, globular, and spray transfer. A fast loop may measure and store instantaneous current and voltage, maintain running averages, and use the instantaneous measurements to determine the desired characteristics for the subsequent fast loop cycle. While in the PI loop, the control circuit 152 may control the welding process (e.g. GMAW or FCAW) in voltage control mode, for example. That is, the first weld control algorithm may be a voltage control mode algorithm.

The PI loop may operate best in the first range of values. The first range of values may include two non-contiguous intervals: a first interval of between about 14 volts and about 17 or may specifically be between 14 volts and 17 volts, and a second interval of between about 20.3 volts and about 30 volts, or may specifically be between 20.3 volts and 30 volts. As such, the term "range" as defined herein may include two or more non-contiguous intervals. The method 300 may proceed from block 330 back to block 320 to re-determine whether the output voltage is still within the first range of values or is now within the second range of values.

If the selected welding process is shielded metal arc welding, the control circuit 152 may control the welding process in current control mode, for example. That is, the first weld control algorithm may be a current control mode algorithm.

In block 340, the control circuit 152 may select the second weld control algorithm. If the selected welding process is gas metal arc welding or flux core arc welding, the second weld control algorithm may be a finite state machine (FSM) loop that governs multiple stages of the short-circuit transfer process. The second range of values may be set to between about 17 volts and about 20.3 volts, or may specifically be between 17 and 20.3 volts. Across this range, the FSM loop may best provide exceptional weld characteristics, including but not limited to spatter, base material penetration, bead shape and heat input, when operated in the short-circuit transfer mode. While in the FSM loop, the control circuit 152 may control the welding process (e.g. GMAW or FCAW) in current control mode or voltage control mode, for example. That is, the second weld control algorithm may be a voltage control mode algorithm or a current control mode algorithm. In some implementations, the control circuit 152 may control both current and voltage during the FSM loop, in which case the second weld control may a combination of a voltage and current control mode algorithm. If the selected welding process is shielded metal arc welding, the control circuit 152 may control the welding process in arc force mode, for example. That is, the second weld control algorithm may be an arc force control mode algorithm. The method 300 may proceed from block 340 back to block 320 to re-determine whether the output voltage is still within the second range of values or is now within the first range of values.

In blocks 330 and 340, the selected ranges (e.g. voltage ranges) thus may provide optimal operation of each algorithm and the control circuit 152 may automatically transition between the algorithms based on changes in the welding parameter (e.g. output voltage) selected by the user or in the feedback measurements (e.g. of the actual output voltage). That is, the control circuit 152 may continuously monitor which of the ranges the welding parameters falls into, and change control algorithms accordingly. Additionally, in blocks 330 and 340, the power supply 110 generates welding power based respectively on the first and second algorithms.

Actual characteristics of the welding power 116, such as the actual output voltage, may be correlated to the user-selected parameters, such as the output voltage. Thus, a user-selected parameter will correspond to the actual output characteristics of the welding power 116. Thus, the welding algorithms, for example the PI and FSM loops, may be normalized to ensure a seamless transitions at voltage bounds, for example 17 volts and 20.3 volts.

In some implementations the control circuit 152 may provide three, four, five, or any number of different automatically selected weld control algorithms based on whether the inputs, feedback, or any combinations thereof, fall into three, four, five, or any number of a plurality of ranges.

In some implementations, selection of welding parameters or detection of feedback in any of the welding processes discussed above may cause selection of alternate circuit paths that effectively implement weld control algorithms. For example, in gas metal arc welding, when the output voltage is in a first range, the system may switch to a first circuit path that effectively implements the PI loop, and when the output voltage is in a second range, the system may switch to a first circuit path that effectively implements the FSM loop.

In some implementations the first or second algorithm may be a controlled dip transfer algorithm. Controlled dip transfer may refer to a cyclical control sequence that regulates power supplies, wire feed motors or shielding gas valves to enhance GMAW short circuit transfer performance. By monitoring instantaneous voltage, current, power, energy, heat or other weld conditions and rapidly varying control techniques, parameters and feedback in response, critical characteristics like penetration, bead shape, or spatter can be balanced or optimized. Controlled dip transfer may be implemented in software or electronics as a finite state machine or other mechanism that selects distinct, specialized control modes or circuits for each identified phase of a the short circuit transfer (also called dip transfer) process.

Figure 4:
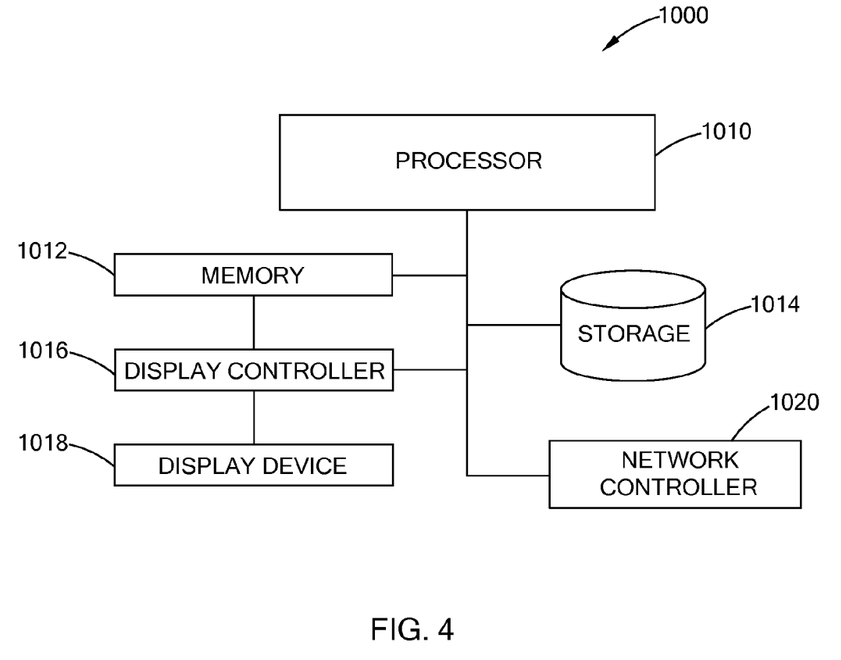
FIG. 4 is a schematic view of a processing system for implementing the methods described herein.

Any of the controllers, control circuits, modules, servers, or engines described may be implemented in one or more computer systems or integrated controllers. One exemplary system is provided in FIG. 4. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for generating a weld for a welding machine, the system comprising:
    a power circuit for generating welding output power for a welding process for the welding machine; and
    a control circuit in communication with the power circuit and configured to:
        receive a selected welding process from a plurality of welding processes, the plurality of welding processes including gas metal arc welding, flux core arc welding, shielded metal arc welding, and inert gas welding;
        receive a value of a magnitude of a detected output voltage for the welding machine;
        automatically select a first weld control algorithm from a plurality of weld control algorithms in the case that the magnitude of the detected output voltage is in a first range of values for the selected welding process, and generate and provide power to the welding machine based on the first algorithm; and
        automatically select a second weld control algorithm from the plurality of weld control algorithms in the case that the magnitude of the detected output voltage is in a second range of values for the selected welding process, and generate and provide power to the welding machine based on the second algorithm.

2. The system of claim 1, further comprising receiving a value of a detected output current, wherein the first weld control algorithm or the second weld control algorithm is selected based on both the detected output current and the magnitude of the detected output voltage.

3. The system of claim 1 wherein the first range of values includes values within a range of between about 14 volts and about 17 volts.

4. The system of claim 1 wherein the first range of values is between about 20.3 volts and about 30 volts.

5. The system of claim 3 wherein the second range of values includes values within a range of between about 17 volts and about 20.3 volts.

6. The system of claim 1 wherein the second range of values is between the first range of values.

7. The system of claim 1 wherein the welding process is flux core arc welding.

8. The system of claim 1 wherein the welding process is gas metal arc welding.

9. The system of claim 8 wherein the first weld control algorithm comprises a voltage control mode algorithm.

10. The system of claim 9 wherein the second weld control algorithm comprises a current control mode algorithm.

11. The system of claim 9 wherein the second weld control algorithm comprises a controlled dip transfer control.

12. The system of claim 9 wherein the second weld control algorithm is implemented as a finite state machine.

13. The system of claim 8 wherein the first weld control algorithm comprises a proportional-integral loop.

14. The system of claim 13 wherein the second weld control algorithm comprises a finite state machine loop.

15. The system of claim 1 wherein the welding process is shielded metal arc welding.

16. The system of claim 15 wherein the first weld control algorithm comprises a current control mode algorithm.

17. The system of claim 16 wherein the second weld control algorithm comprises an arc force control mode algorithm.

18. The system of claim 1 wherein the welding process is gas tungsten arc welding.

19. The system of claim 1 wherein the control circuit is further configured to select a third weld control algorithm from the plurality of weld control algorithms when the magnitude of the voltage is in a third range of values.

20. The system of claim 1 wherein the first and second weld control algorithms are each selected from the group of a current control mode algorithm, a voltage control mode algorithm, a controlled dip transfer algorithm, a finite state machine and an arc force control mode algorithm.

21. A method for generating a weld for a welding machine, the method comprising:
    receiving, at a control circuit, a magnitude of a detected voltage;
    receiving a selected welding process from a plurality of welding processes, the plurality of welding processes including gas metal arc welding, flux core arc welding, shielded metal arc welding, and inert gas welding;
    automatically selecting a first weld control algorithm from a plurality of weld control algorithms in the case that the magnitude of the detected voltage is in a first range of values for the selected welding process, and generate and provide power to the welding machine via the power circuit based on the first weld control algorithm;
    automatically selecting a second weld control algorithm from the plurality of weld control algorithms in the case that the magnitude of the detected voltage is in a second range of values for the selected welding process, and generate and provide power to the welding machine via the power circuit based on the second weld control algorithm; and
    generating and providing welding output power to the welding machine based on the selected first or second weld control algorithms.

22. The method of claim 21 wherein the first weld control algorithm comprises a current control mode algorithm.

23. The method of claim 21 wherein the second weld control algorithm comprises a voltage control mode algorithm.

24. The method of claim 21 wherein the second weld control algorithm comprises a controlled dip transfer control.

25. The method of claim 21 wherein the second weld control algorithm is implemented as a finite state machine.

26. The method of claim 21 wherein the second weld control algorithm comprises an arc force control mode algorithm.

27. A method for generating a weld for a welding machine, the method comprising:
    receiving, at a control circuit, a value of a magnitude of a detected output voltage of the welding machine;
    receiving a selected welding process from a plurality of welding processes, the plurality of welding processes including gas metal arc welding, flux core arc welding, shielded metal arc welding, and inert gas welding;

automatically selecting a first weld control algorithm from the plurality of weld control algorithms in the case that the magnitude of the detected voltage is in a first range of values for the selected welding process, and generate and provide power to the welding machine via the power circuit based on the first weld control algorithm;

automatically selecting a second weld control algorithm from the plurality of weld control algorithms in the case that the magnitude of the detected voltage is in a second range of values for the selected welding process, and generate and provide power to the welding machine via the power circuit based on the second weld control algorithm;

generating and providing welding output power to the welding machine based on the selected first or second weld control algorithms;

continuously monitoring the magnitude of the detected voltage after the welding output power has been provided to the welding machine; and determining whether to change the selected first or second weld control algorithm based on the continuously monitored magnitude of the detected voltage.

* * * * *